(12) United States Patent
Yasuda

(10) Patent No.: US 6,621,094 B2
(45) Date of Patent: Sep. 16, 2003

(54) RADIATION IMAGE READ-OUT METHOD AND APPARATUS

(75) Inventor: Hiroaki Yasuda, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 16 days.

(21) Appl. No.: 09/875,092

(22) Filed: Jun. 7, 2001

(65) Prior Publication Data

US 2001/0052583 A1 Dec. 20, 2001

(30) Foreign Application Priority Data

Jun. 7, 2000 (JP) ........................................ 2000-169939

(51) Int. Cl.[7] ................................................. G03B 42/02
(52) U.S. Cl. ........................................ 250/586; 250/584
(58) Field of Search ................................... 250/586, 584, 250/585, 587, 591, 559.06, 459.1, 484.1, 458.1, 235, 236, 363.02, 363.07, 363.08

(56) References Cited

U.S. PATENT DOCUMENTS

| 4,816,679 | A |   | 3/1989  | Sunagawa et al. | ....... 250/372.2 |
| 4,922,103 | A |   | 5/1990  | Kawajiri et al. | ......... 250/327.2 |
| 4,942,300 | A | * | 7/1990  | Mori et al.     | ................. 250/583 |
| 5,525,866 | A | * | 6/1996  | Mueller et al.  | .......... 315/169.3 |
| 6,326,636 | B1| * | 12/2001 | Isoda et al.    | ................. 250/586 |
| 6,396,218 | B1| * | 5/2002  | Proctor         | .................... 315/169.3 |
| 6,507,040 | B2|   | 1/2003  | Isoda           |  |

FOREIGN PATENT DOCUMENTS

| JP | 60-111568   | 6/1985  | ............ H04N/1/04 |
| JP | 60-236354   | 11/1985 | ............ H04N/1/04 |
| JP | 1-101540    | 4/1989  | ............ G03B/42/02 |
| JP | 2000-100738 | 4/2000  | ......... H01L/21/205 |

* cited by examiner

Primary Examiner—Constantine Hannaher
Assistant Examiner—Otilia Gabor
(74) Attorney, Agent, or Firm—Sughrue Mion, PLLC

(57) ABSTRACT

Stimulating rays produced by a line light source are linearly irradiated onto an area of a stimulable phosphor sheet, on which a radiation image has been stored. Light, which is emitted from the linear area of the sheet exposed to the linear stimulating rays, is received and photoelectrically converted by a line sensor. The line sensor comprises a pair of one-dimensional CCD image sensors. Light receiving regions of the one-dimensional CCD image sensors are located close to each other with respect to a direction normal to the length direction of the linear area of the sheet and with a fine gap intervening between the light receiving regions.

19 Claims, 5 Drawing Sheets

SECT. I—I

F I G. 3
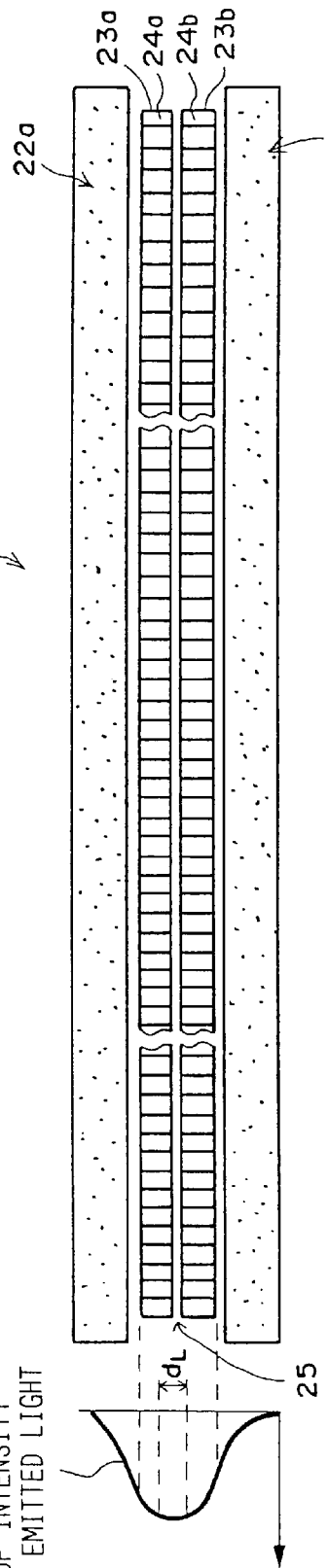
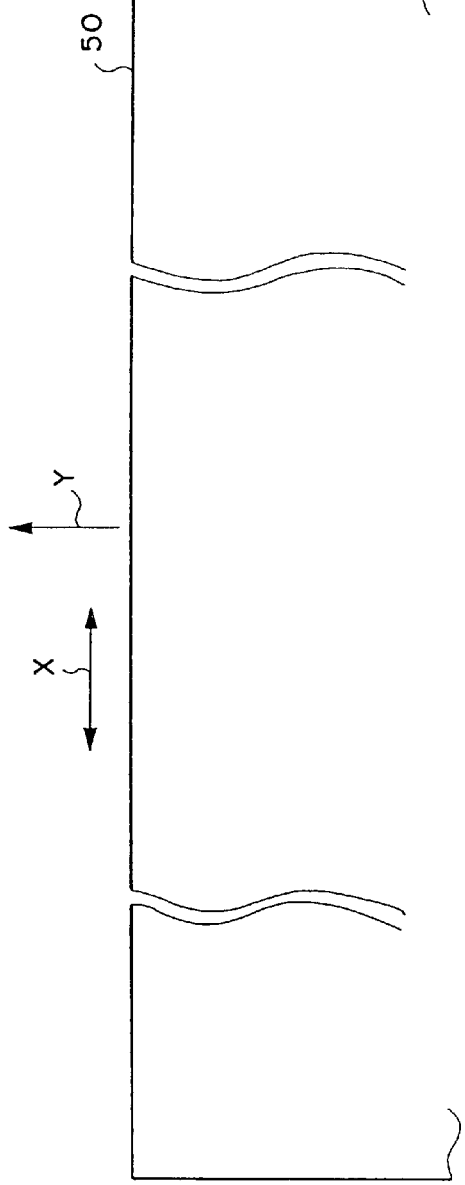

RADIATION IMAGE READ-OUT METHOD AND APPARATUS

BACKGROUND OF THE INVENTION

1. Field of the Invention

This invention relates to a radiation image read-out method and apparatus. This invention particularly relates to a radiation image read-out method and apparatus, wherein a radiation image having been stored on a stimulable phosphor sheet is read out with a line sensor.

2. Description of the Related Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate. Stimulating rays, such as a laser beam, are deflected and caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation energy remaining thereon is thereby released.

Also, a novel radiation image recording and reproducing system aiming at enhancement of a detection quantum efficiency in the formation of the radiation image, i.e., a radiation absorptivity, alight emission efficiency, an emitted light pickup efficiency, and the like, has been proposed in, for example, Japanese patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics is caused to absorb the radiation and to emit light having wavelengths falling within a ultraviolet to visible region. Also, the phosphor having good light emission response characteristics is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or on a high resolution cathode ray tube (CRT) display device. In cases where the stimulable phosphor sheet, from which the image signal has been detected, is then exposed to the erasing light, and energy remaining on the stimulable phosphor sheet is thereby released, the erased stimulable phosphor sheet is capable of being used again for the recording of a radiation image.

Novel radiation image read-out apparatuses for use in the radiation image recording and reproducing systems described above have been proposed in, for example, Japanese Unexamined patent publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line light source for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which linear area the stimulating rays are irradiated by the line light source, is utilized as photoelectric read-out means. (The length direction of the linear area of the stimulable phosphor sheet will hereinbelow be referred to as the main scanning direction.) Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet. (The direction, which is approximately normal to the length direction of the linear area of the stimulable phosphor sheet, will hereinbelow be referred to as the sub-scanning direction.)

FIG. 5 is an explanatory view showing spread of light emitted by a stimulable phosphor sheet. As illustrated in FIG. 5, in the cases of a transmission type of constitution, wherein a line light source and a line sensor are located on opposite surface sides of a stimulable phosphor sheet, a stimulable phosphor layer 50a of a stimulable phosphor sheet 50', on which a radiation image has been stored, is exposed to stimulating rays L having been produced by a stimulating ray source and is caused to emit light M in proportion to the amount of stored energy carrying radiation image information. Also, the emitted light M passes through a substrate 50b capable of transmitting the emitted light M and is projected onto each of photoelectric conversion devices 21, 21, . . . acting as light receiving devices. In such cases, for example, after the stimulating rays L impinge upon the stimulable phosphor sheet 50', the stimulating rays L are scattered within the stimulable phosphor sheet 50'. Also, the emitted light M, which has been produced by the stimulable phosphor sheet 50' when the stimulable phosphor sheet 50' is exposed to the stimulating rays L, is scattered within the stimulable phosphor sheet 50' before the emitted light M is radiated out from the surface of the stimulable phosphor sheet 50'. Due to such reasons, a width $d_M$ of the emitted light M becomes larger than a width $d_L$ of the stimulating rays L, and the emitted light M spreads inevitably.

The same problems as in the cases of the transmission type of constitution also occur in the cases of a reflection type of constitution, wherein the line light source and the line sensor are located on an identical surface side of a stimulable phosphor sheet.

As illustrated in FIG. 5, in cases where the emitted light M is collected by a line sensor, wherein a width $d_P$ of each photoelectric conversion device 21, which width $d_P$ is taken in the direction normal to the main scanning direction, is smaller than the width $d_M$ of the emitted light M, which width $d_M$ is taken in the beam width direction of the emitted light M, the light collecting efficiency cannot be kept high due to leakage of the emitted light M, and therefore an image having good image quality cannot be obtained. Accordingly, how the spread of the emitted light M is ascertained and how the emitted light M is collected such that the amount of light, which does not impinge upon the photoelectric conversion device 21, may be reduced are the important problems for determining the image quality of the obtained image.

FIG. 6 is a graph showing an intensity distribution of light emitted by a stimulable phosphor sheet. As illustrated in FIG. 6, the intensity of the emitted light M is high at the center region of the beam of the emitted light M, which center region corresponds to the width $d_L$ of the stimulating rays L, and becomes low at positions spaced outwardly from the optical axis of the stimulating rays L. Since noise becomes relatively strong in weak light, it is important that the amount of the emitted light M collected is kept large, and the emitted light as close to the center region of the beam of the emitted light M as possible is collected by considering the balance with the cost and noise.

In U.S. Pat. No. 6,507,049, the applicant proposed a technique, wherein multiple rows of photoelectric conversion devices constituting a line sensor are arrayed such that the multiple rows stand side by side with respect to a direction normal to the main scanning direction, and a light receiving width of the line sensor, which light receiving width is taken in the direction normal to the main scanning direction, is thereby kept large. However, with the proposed technique, a charge transfer region, which is not capable of receiving the emitted light M, is located between light receiving regions of adjacent rows of the photoelectric conversion devices, which adjacent rows stand side by side with respect to the direction normal to the main scanning direction. Therefore, the width of the line sensor, which width is taken in the direction normal to the main scanning direction, is large, but the problems occur in that the efficiency, with which the emitted light at the center region of the beam of the emitted light close to the optical axis of the stimulating rays L is collected, cannot be kept high.

SUMMARY OF THE INVENTION

The primary object of the present invention is to provide a radiation image read-out method, wherein emitted light at a center region of a beam of the light emitted by a stimulable phosphor sheet, at which center region an intensity of the emitted light is high, is capable of being collected efficiently, a substantial light receiving width of a line sensor is capable of being kept large, and an image having good image quality is capable of being obtained.

Another object of the present invention is to provide an apparatus for carrying out the radiation image read-out method.

The present invention provides a radiation image read-out method, comprising the steps of:

i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor, the received light being subjected to photoelectric conversion performed by the line sensor, iii) moving the stimulable phosphor sheet with respect to the line light source and the line sensor and in a direction different from a length direction of the linear area of the stimulable phosphor sheet, and iv) successively reading outputs of the line sensor in accordance with the movement, wherein the line sensor comprises a pair of one-dimensional charge coupled device image sensors, and light receiving regions of the one-dimensional charge coupled device image sensors are located close to each other so as to stand side by side with respect to a direction, which is normal to the length direction of the linear area of the stimulable phosphor sheet, and with a fine gap intervening between the light receiving regions.

The present invention also provides a radiation image read-out apparatus for carrying out the radiation image read-out method in accordance with the present invention. Specifically, the present invention also provides a radiation image read-out apparatus, comprising:

i) a line light source for linearly irradiating stimulating rays onto an area of one surface of a stimulable phosphor rays causing the stimulable phosphor sheet to emit light in proportion to an amount of energy stored thereon during its exposure to radiation, ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, iii) scanning means for moving the stimulable phosphor sheet with respect to the line light source and the line sensor and in a direction different from a length direction of the linear area of the stimulable phosphor sheet, and iv) reading means for successively reading outputs of the line sensor in accordance with the movement, wherein the line sensor comprises a pair of one-dimensional charge coupled device image sensors, and light receiving regions of the one-dimensional charge coupled device image sensors are located close to each other so as to stand side by side with respect to a direction, which is normal to the length direction of the linear area of the stimulable phosphor sheet, and with a fine gap intervening between the light receiving regions.

In the radiation image read-out method and apparatus in accordance with the present invention, as the line light source, a fluorescent lamp, a cold cathode fluorescent lamp, a light emitting diode (LED) array, or the like, may be employed. The line light source may be a light source having a linear shape as in the cases of the fluorescent lamp. Alternatively, the line light source may be a light source operating such that the produced stimulating rays are formed into a line light beam. For example, the line light source may be a broad area laser, or the like. The stimulating rays radiated out from the line light source may be radiated out continuously. Alternatively, the stimulating rays radiated out from the line light source may be radiated out as pulsed stimulating rays, which are radiated out intermittently. From the point of view of reducing noise, the stimulating rays should preferably be pulsed stimulating rays having a high intensity.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

The direction along which the stimulable phosphor sheet is moved with respect to the line light source and the line sensor (i.e., the direction different from the length direction of the exposed linear area of the stimulable phosphor sheet) should preferably be the direction approximately normal to the length direction of the exposed linear area of the stimulable phosphor sheet (i.e., should preferably be the minor axis direction). However, the direction along which the stimulable phosphor sheet is moved with respect to the line light source and the line sensor is not limited to the minor axis direction. For example, the stimulable phosphor sheet may be moved with respect to the line light source and the line sensor along an oblique direction with respect to the direction approximately normal to the length direction of the line light source and the line sensor or along a zigzag movement direction, such that approximately the entire surface of the stimulable phosphor sheet may be uniformly exposed to the stimulating rays.

The line light source and the line sensor may be located on the same surface side of the stimulable phosphor sheet or on opposite surface sides of the stimulable phosphor sheet. In cases where the line light source and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

In the radiation image read-out method and apparatus in accordance with the present invention, the outputs of respective pixels of the light receiving regions of the one-dimensional charge coupled device image sensors (one-dimensional CCD image sensors) may be fed into an image processing unit, such that it is clear which outputs correspond to which site on the stimulable phosphor sheet. Also, in the image processing unit, operation processing may be performed on the outputs of the one-dimensional CCD image sensors, which outputs correspond to an identical site on the stimulable phosphor sheet, in order to obtain an output corresponding to the identical site on the stimulable phosphor sheet. In the radiation image read-out method and apparatus in accordance with the present invention, addition processing should preferably be performed (with operation processing means) on the outputs of pixels of the light receiving regions of the one-dimensional CCD image sensors, which pixels are located close to each other so as to stand side by side with respect to the direction normal to the length direction of the linear area of the stimulable phosphor sheet.

The addition processing may be simple addition processing, mean calculation processing, or weighted addition processing.

Also, in the radiation image read-out method and apparatus in accordance with the present invention, the stimulable phosphor sheet for storing the radiation image may be an ordinary stimulable phosphor sheet comprising a stimulable phosphor for absorbing radiation and storing energy from the radiation, i.e. the radiation image.

Further, the radiation image read-out method and apparatus in accordance with the present invention may be employed in the radiation image recording and reproducing system proposed in, for example, Japanese patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., a phosphor for radiation absorption) is caused to absorb the radiation and to emit light having wavelengths falling within a ultraviolet to visible region. Also, the phosphor having good light emission response characteristics (i.e., a phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained. With the proposed radiation image recording and reproducing system, the detection quantum efficiency in the formation of the radiation image, i.e., the radiation absorptivity, the light emission efficiency, the emitted light pickup efficiency, and the like, is capable of being enhanced as a whole. Therefore, in the radiation image read-out method and apparatus in accordance with the present invention, the stimulable phosphor sheet should preferably contain the phosphor for energy storage described above.

The phosphor for energy storage absorbs the light having wavelengths falling within the ultraviolet to visible region, which light has been emitted by the phosphor for radiation absorption, and stores the energy of the emitted light as the image information. The light having wavelengths falling within the ultraviolet to visible region is the light emitted by the phosphor for radiation absorption when the phosphor for radiation absorption absorbs the radiation. Therefore, the image information having been stored on the phosphor for energy storage is taken as the radiation image.

Furthermore, in the radiation image read-out method and apparatus in accordance with the present invention, positions of pixels of one of the one-dimensional CCD image sensors and positions of pixels of the other one-dimensional CCD image sensor should preferably be shifted from each other in the length direction of the linear area of the stimulable phosphor sheet.

Also, in the radiation image read-out method and apparatus in accordance with the present invention, a width of the fine gap between the light receiving regions of the one-dimensional CCD image sensors, which width is taken in the direction normal to the length direction of the linear area of the stimulable phosphor sheet, should preferably be smaller than the width of each of the two light receiving regions, which width is taken in the direction normal to the length direction of the linear area of the stimulable phosphor sheet.

Further, in the radiation image read-out method and apparatus in accordance with the present invention, such that the degree of light collection by the line sensor may be enhanced, a sum of widths of the two light receiving regions and a width of the fine gap, which widths are taken in the direction normal to the length direction of the linear area of the stimulable phosphor sheet, should preferably be larger than a beam diameter of the stimulating rays, which beam diameter is taken in the direction normal to the length direction of the linear area of the stimulable phosphor sheet.

Furthermore, such that the degree of light collection, with which the light emitted from respective sites on the stimulable phosphor sheet is collected by the line sensor, may be enhanced, the radiation image read-out method and apparatus in accordance with the present invention should preferably be modified such that a light guiding optical system for guiding the light, which is emitted by the stimulable phosphor sheet, to a light receiving surface of the line sensor is located between the stimulable phosphor sheet and the line sensor, and the light guiding optical system is either one of an equi-magnification optical system and a magnifying optical system.

Also, in the radiation image read-out method and apparatus in accordance with the present invention, a stimulating ray cut-off filter (a sharp cut-off filter or a band-pass filter) for transmitting only the light emitted by the stimulable phosphor sheet and filtering out the stimulating rays should preferably be located between the stimulable phosphor sheet and the line sensor. In this manner, the stimulating rays should preferably be prevented from impinging upon the line sensor.

With the radiation image read-out method and apparatus in accordance with the present invention, the line sensor for performing photoelectric conversion comprises the pair of the one-dimensional CCD image sensors, and the light receiving regions of the one-dimensional CCD image sensors are located close to each other so as to stand side by side with respect to the direction, which is normal to the length direction of the linear stimulating rays irradiated from the line light source, and with the fine gap intervening between the light receiving regions. Therefore, no charge transfer region intervenes between the light receiving regions of the line sensor as a whole. Accordingly, the emitted light at the center region of the beam of the emitted light close to the optical axis of the stimulating rays, at which center region the intensity of the emitted light is high, is capable of being collected efficiently. Also, the substantial light receiving width of the line sensor is capable of being kept large, and the efficiency, with which the emitted light is collected, is capable of being kept high. As a result, an image having good image quality is capable of being obtained.

Also, with the radiation image read-out method and apparatus in accordance with the present invention, the emitted light at the center region of the beam of the emitted light close to the optical axis of the stimulating rays, at which center region the intensity of the emitted light is high, is primarily collected. Therefore, even if the weak emitted light at regions comparatively remote from the optical axis of the stimulating rays is not collected, the efficiency, with which the emitted light is collected, is capable of being kept high. Accordingly, noise is capable of being suppressed, and the size of the radiation image read-out apparatus is capable of being kept small.

With the radiation image read-out method and apparatus in accordance with the present invention, wherein the stimulable phosphor sheet contains the phosphor for energy storage described above, the image quality of the obtained image is capable of being enhanced even further.

With the radiation image read-out method and apparatus in accordance with the present invention, wherein the positions of the pixels of one of the one-dimensional CCD image sensors and the positions of the pixels of the other one-dimensional CCD image sensor are shifted from each other in the length direction of the linear area of the stimulable phosphor sheet, variation in quality among the pixels of the line sensor is capable of being compensated for, and therefore uniformity of the line sensor as a whole is capable of being kept high.

With the radiation image read-out method and apparatus in accordance with the present invention, wherein the width of the fine gap between the light receiving regions of the one-dimensional CCD image sensors, which width is taken in the direction normal to the length direction of the linear area of the stimulable phosphor sheet, is smaller than the width of each of the two light receiving regions, which width is taken in the direction normal to the length direction of the linear area of the stimulable phosphor sheet, photoelectric conversion with a high aperture ratio is capable of being performed.

With the radiation image read-out method and apparatus in accordance with the present invention, wherein the sum of the widths of the two light receiving regions and the width of the fine gap, which widths are taken in the direction normal to the length direction of the linear area of the stimulable phosphor sheet, is larger than the beam diameter of the stimulating rays, which beam diameter is taken in the direction normal to the length direction of the linear area of the stimulable phosphor sheet, at least the emitted light at the region of the beam of the emitted light, at which region the intensity of the emitted light is high, is capable of being collected. Therefore, the light collecting efficiency is capable of being enhanced even further.

BRIEF DESCRIPTION OF THE DRAWINGS

FIG. 3 is an explanatory view showing an example of a line sensor in the embodiment of FIG. 1.

DESCRIPTION OF THE PREFERRED EMBODIMENTS

The present invention will hereinbelow be described in further detail with reference to the accompanying drawings.

Figure 1:
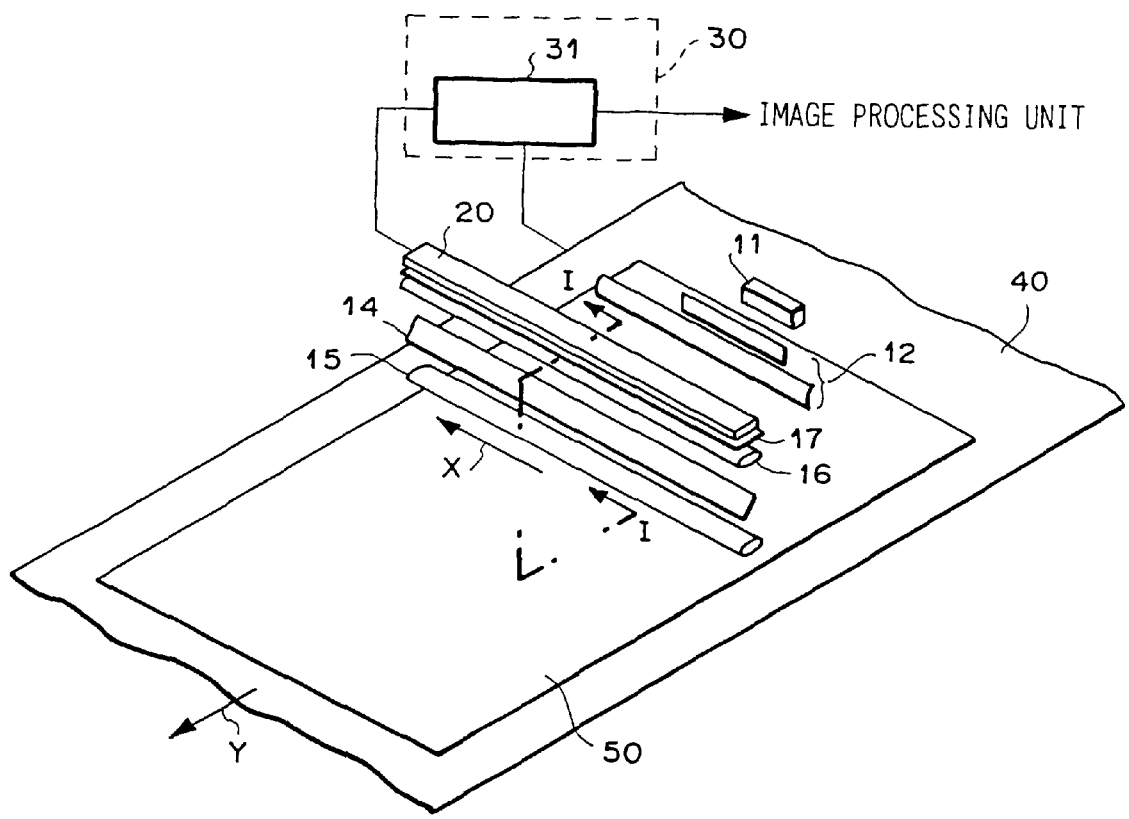
FIG. 1 is a perspective view showing an embodiment of the radiation image read-out apparatus in accordance with the present invention.
Figure 2:
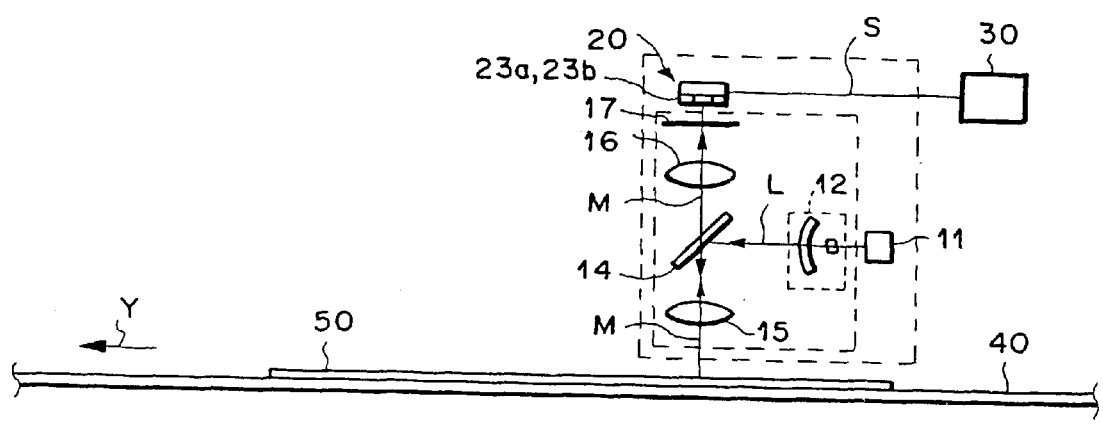
FIG. 2 is a sectional view taken on line I—I of FIG. 1.
Figure 4:
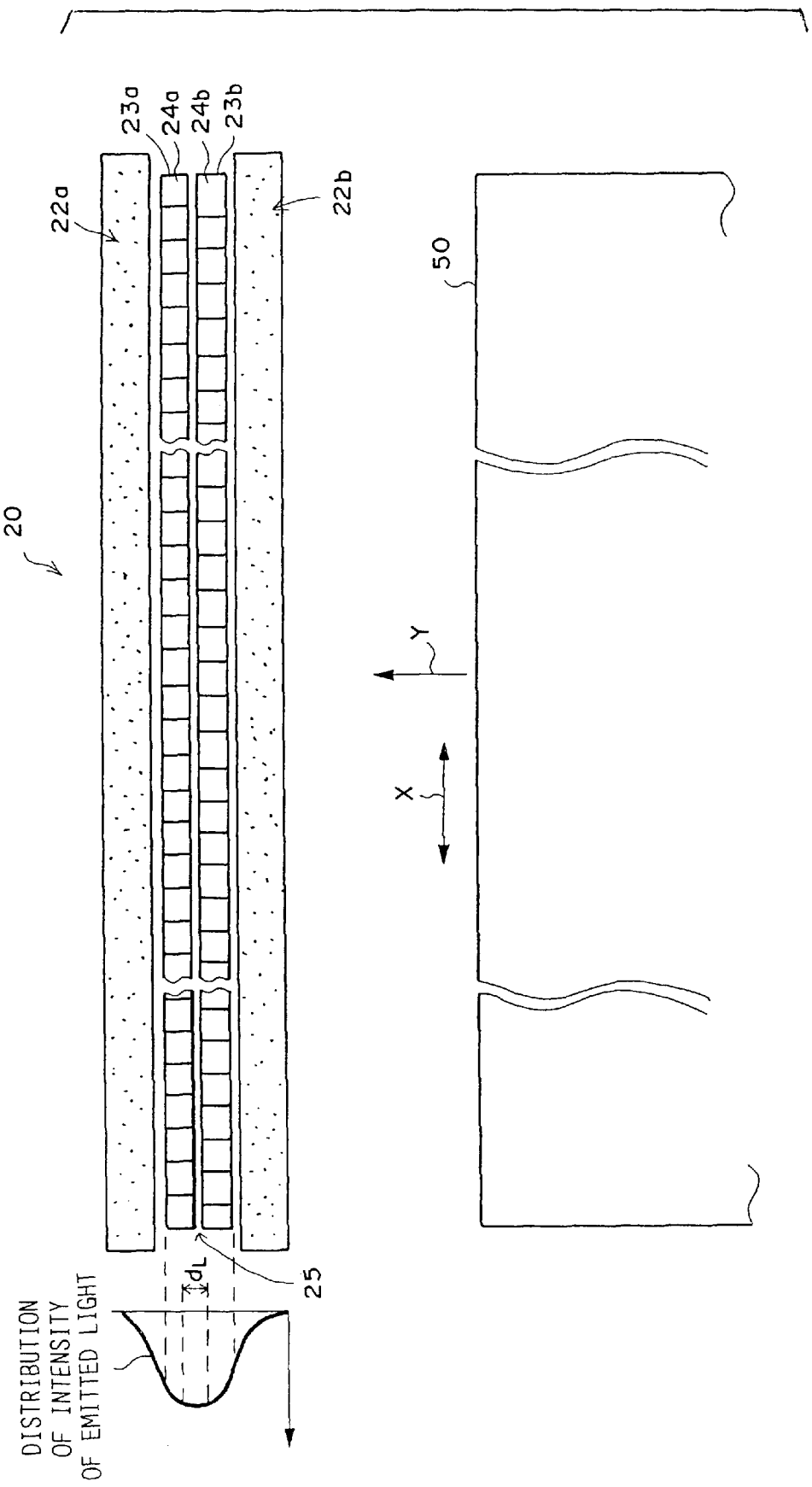
FIG. 4 is an explanatory view showing a different example of a line sensor in the embodiment of FIG. 1.
Figure 5:
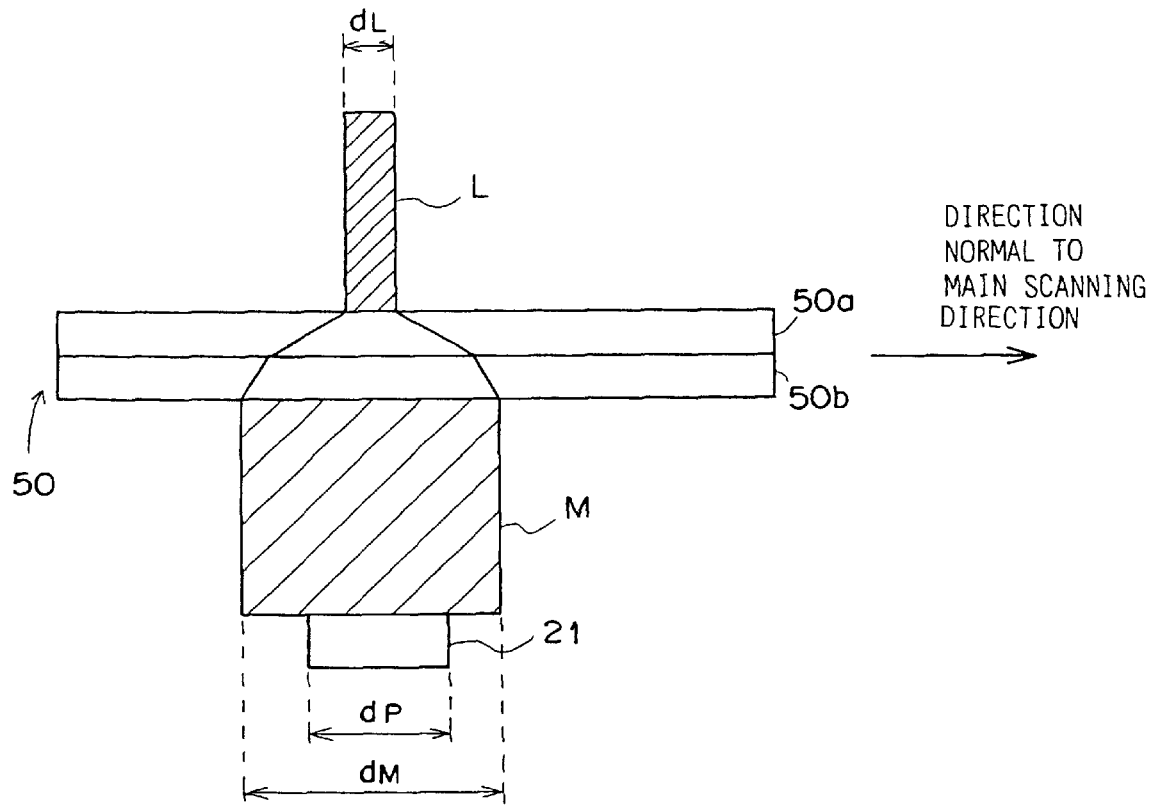
FIG. 5 is an explanatory view showing spread of light emitted by a stimulable phosphor sheet.
Figure 6:
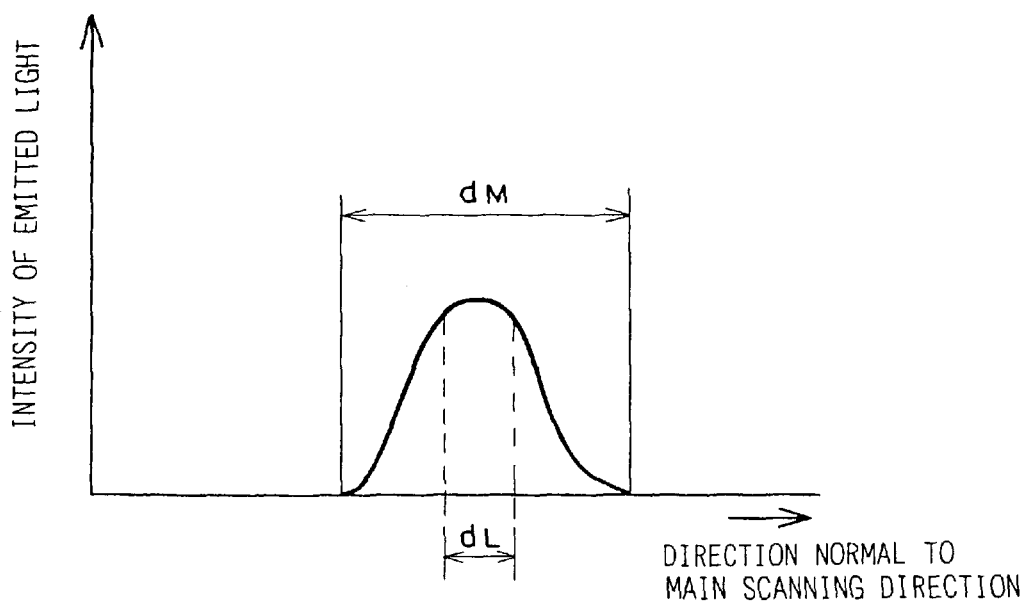
FIG. 6 is a graph showing an intensity distribution of light emitted by a stimulable phosphor sheet.

FIG. 1 is a perspective view showing an embodiment of the radiation image read-out apparatus in accordance with the present invention. FIG. 2 is a sectional view taken on line I—I of FIG. 1. FIG. 3 is an explanatory view showing an example of a line sensor in the embodiment of FIG. 1. FIG. 4 is an explanatory view showing a different example of a line sensor in the embodiment of FIG. 1.

With reference to FIGS. 1 and 2, the radiation image read-out apparatus comprises a scanning belt 40 for supporting a stimulable phosphor sheet (hereinbelow referred to simply as the sheet) 50, on which a radiation image has been stored, and conveying the sheet 50 in the direction indicated by the arrow Y. The radiation image read-out apparatus also comprises a broad area laser (hereinbelow referred to as the BLD) 11 for radiating out secondary stimulating rays (hereinbelow referred to simply as the stimulating rays) L having a linear pattern with a line width of approximately 100 μm. The stimulating rays L are radiated out approximately in parallel with the surface of the sheet 50. The radiation image read-out apparatus further comprises an optical system 12, which is constituted of a combination of a collimator lens for collimating the linear stimulating rays L having been radiated out of the BLD 11 and a toric lens for expanding the beam only in one direction. The radiation image read-out apparatus still further comprises a dichroic mirror 14, which is located at an angle of 45 degrees with respect to the surface of the sheet 50 and which is set so as to reflect the stimulating rays L and to transmit emitted light M described later. The radiation image read-out apparatus also comprises a distributed index lens array (constituted of an array of a plurality of distributed index lenses and hereinbelow referred to as the first SELFOC lens array) 15. The first SELFOC lens array 15 converges the linear stimulating rays L, which have been reflected from the dichroic mirror 14, into a linear beam (having a line width of approximately 100 μm) extending along the direction indicated by the arrow X on the sheet 50. Also, the first SELFOC lens array 15 collimates the emitted M, which is emitted by the sheet 50 exposed to the linear stimulating rays L and which carries image information of the radiation image stored on the sheet 50. The radiation image read-out apparatus further comprises a second SELFOC lens array 16 for converging the emitted light M, which has been collimated by the first SELFOC lens array 15 and has then passed through the dichroic mirror 14, onto light receiving regions 23a and 23b of a pair of one-dimensional CCD image sensors constituting a line sensor 20, which will be described later. The radiation image read-out apparatus still further comprises a stimulating ray cut-off filter 17 for transmitting only the emitted light M and filtering out the stimulating rays L, which have been reflected from the surface of the sheet 50 and which are mixed slightly in the emitted light M having passed through the second SELFOC lens array 16. The radiation image read-out apparatus also comprises the line sensor 20 for receiving the emitted light M having passed through the stimulating ray cut-off filter 17 and for photoelectrically converting the emitted light M. The radiation image read-out apparatus further comprises image information reading means 30. The image information reading means 30 performs operation processing on outputs of pixel regions 24a and 24b of the pair of the one-dimensional CCD image sensors constituting the line sensor 20, which outputs correspond to an identical site on the sheet 50. The image information reading means 30 feeds out the results of the operation processing as an image signal.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the one-dimensional CCD image sensors.

The optical system 12, which is constituted of the collimator lens and the toric lens, expands the stimulating rays L, which come from the BLD 11, into a desired irradiation area on the dichroic mirror 14.

As illustrated in FIG. 3, the line sensor 20 comprises the pair of the one-dimensional CCD image sensors. The light receiving regions 23a and 23b of the pair of the one-dimensional CCD image sensors are located close to each other so as to stand side by side with respect to the direction indicated by the arrow Y (i.e, the direction along which the sheet 50 is conveyed) and with a fine gap 25 intervening between the light receiving regions 23a and 23b. In this embodiment, the width of each of the light receiving regions 23a and 23b of the one-dimensional CCD image sensors, which width is taken in the direction indicated by the arrow Y, is 100 μm. Also, one of the one-dimensional CCD image sensors comprises a plurality of the pixel regions 24a, 24a, arrayed in the main scanning direction indicated by the arrow X, and the other one-dimensional CCD image sensor comprises a plurality of the pixel regions 24b, 24b, . . . arrayed in the main scanning direction indicated by the arrow X. In the example shown in FIG. 3, the positions of the pixel regions 24a, 24a, . . . of the one one-dimensional CCD image sensor and the positions of the pixel regions 24b, 24b, . . . of the other one-dimensional CCD image sensor are not shifted from each other in the main scanning direction.

Alternatively, as illustrated in FIG. 4, such that variation in quality among the pixel regions 24a, 24a, . . . and the pixel regions 24b, 24b, . . . of a line sensor 20' is capable of being compensated for, the positions of the pixel regions 24a, 24a, . . . of the one one-dimensional CCD image sensor and the positions of the pixel regions 24b, 24b, . . . of the other one-dimensional CCD image sensor may be shifted from each other in the main scanning direction. In this manner, uniformity of the line sensor 20' as a whole may be kept high.

How this embodiment of the radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into addition means 31 of the image information reading means 30.

The BLD 11 radiates out the stimulating rays L having a linear pattern with a line width of approximately 100 μm. The stimulating rays L are radiated out approximately in parallel with the surface of the sheet 50. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 50. The reflected stimulating rays L are converged by the first SELFOC lens array 15 into a linear beam (having a line width $d_L$ of approximately 100 μm) extending along the direction indicated by the arrow X on the sheet 50.

When the sheet 50 is exposed to and stimulated by the linear stimulating rays L, the light M having an intensity in accordance with the image information stored on the sheet 50 is emitted from the area containing the exposed area and the neighboring areas. The emitted light M is collimated by the first SELFOC lens array 15, passes through the dichroic mirror 14, and is converged by the second SELFOC lens array 16 onto the light receiving regions 23a and 23b of the one-dimensional CCD image sensors constituting the line sensor 20. At this time, the stimulating rays L, which have been reflected from the surface of the sheet 50 and are mixed slightly in the emitted light M having passed through the second SELFOC lens array 16, are filtered out by the stimulating ray cut-off filter 17.

FIGS. 3 and 4 also show the relationship between the width of the light receiving regions 23a and 23b of the one-dimensional CCD image sensors and the distribution of the emitted light M on the light receiving surface of the line sensor 20. As illustrated in FIGS. 3 and 4, charge transfer regions 22a and 22b do not intervene between the light receiving regions 23a and 23b, which stand side by side with respect to the direction indicated by the arrow Y. (The sum of the widths of the light receiving regions 23a and 23b is approximately equal to 200 μm.) Therefore, the emitted light at the center region of the beam of the emitted light M, at which center region the intensity of the emitted light is high, is primarily collected by the line sensor 20 as a whole. Therefore, the efficiency, with which the emitted light M is collected, is capable of being kept high.

In this embodiment, as an aid in facilitating the explanation, the optical system between the sheet 50 and the line sensor 20 is set as a one-to-one image forming system. Alternatively, the optical system between the sheet 50 and the line sensor 20 may be set as a magnifying optical system or a contracting optical system. However, from the point of view of enhancing the light collecting efficiency, the optical system between the sheet 50 and the line sensor 20 should preferably be set as the equi-magnification optical system or the magnifying optical system.

The line sensor 20 photoelectrically converts the emitted light M, which has been received by each of the light receiving regions 23a and 23b of the one-dimensional CCD image sensors, and obtains signal components Qa, Qa, . . . and signal components Qb, Qb, . . . from the photoelectric conversion. The signal components Qa, Qa, . . . and signal components Qb, Qb, . . . are fed into the addition means 31. Each of the signal components Qa, Qa, . . . corresponds to one of the pixel regions 24a, 24a, . . . of the one one-dimensional CCD image sensor. Also, each of the signal components Qb, Qb, . . . corresponds to one of the pixel regions 24b, 24b, . . . of the other one-dimensional CCD image sensor. An image signal made up of the signal components Qa, Qa, . . . and the signal components Qb, Qb, . . . is represented by S in FIG. 2.

The addition means 31 performs the addition processing on the signal component Qa and the signal component Qb respectively corresponding to the pixel region 24a and the pixel region 24b, which are closest to each other with respect to the direction indicated by the arrow Y. A signal component Q is obtained from the addition processing. Also, in accordance with the movement speed of the scanning belt 40, the addition means 31 cumulates and stores the thus obtained signal components Q, Q, . . . in memory regions corresponding to respective sites on the sheet 50. The signal components Q, Q, . . . are thereafter fed out as the image information to an image processing unit.

As described above, with this embodiment of the radiation image read-out apparatus in accordance with the present invention, the pair of the one-dimensional CCD image sensors, which have a light receiving width $d_P$ ($<d_M$) smaller than a line width $d_M$ of the emitted light M (i.e., the line width on the light receiving surface of the line sensor 20), are located with the fine gap 25 intervening between the light receiving regions 23a and 23b. The line sensor 20 is constituted in this manner. Therefore, no charge transfer region intervenes between the light receiving regions 23a and 23b of the one-dimensional CCD image sensors, and the substantial light receiving width is capable of being kept large. Also, of the light M emitted by the sheet 50 when the sheet 50 is exposed to the linear stimulating rays L irradiated from the stimulating ray source, the region of the emitted light M, at which the intensity of the emitted light is high, is capable of being received primarily. As a result, the emitted light is capable of being collected efficiently. Further, the problems are capable of being prevented from occurring in that much noise occurs due to the collection of weak emitted light. Furthermore, the cost of the radiation image read-out apparatus is capable of being kept low.

The radiation image read-out apparatus in accordance with the present invention is not limited to the embodiment described above and may be embodied in various other ways. For example, various known constitutions may be employed as the light source, the light guiding optical system between the light source and the sheet, the optical systems between the sheet and the line sensor, the line sensor, or the addition means. Also, the radiation image read-out apparatus may further comprise an image processing unit, which performs various kinds of signal processing on the image signal obtained from the image information reading means 30, and/or erasing means for appropriately releasing radiation energy remaining on the sheet from which the image signal has been detected.

Also, in the aforesaid embodiment of the radiation image read-out apparatus in accordance with the present invention, part of the optical path of the stimulating rays L and part of the optical path of the emitted light M overlap each other, and the size of the apparatus is thereby reduced. Alternatively, for example, as illustrated in FIG. 7, the radiation image read-out apparatus in accordance with the present invention may be constituted such that the optical path of the stimulating rays L and the optical path of the emitted light M may not overlap each other.

Figure 7:
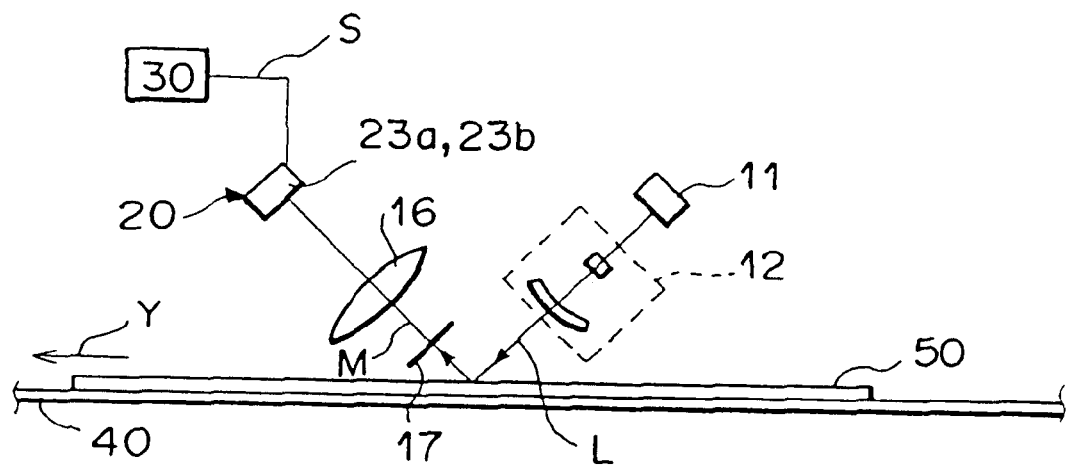
FIG. 7 is a schematic view showing a different embodiment of the radiation image read-out apparatus in accordance with the present invention.

Specifically, the radiation image read-out apparatus illustrated in FIG. 7 comprises the scanning belt 40 and the BLD 11 for radiating out the linear stimulating rays L at an angle of approximately 45 degrees with respect to the surface of the sheet 50. The radiation image read-out apparatus also comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the surface of the sheet 50. The radiation image read-out apparatus further comprises the SELFOC lens array 16 having an optical axis, which is inclined at an angle of approximately 45 degrees with respect to the surface of the sheet 50 and which is approximately normal to the direction of travel of the stimulating rays L. The SELFOC lens array 16 converges the light M, which is emitted by the sheet 50 when the sheet 50 is exposed to the stimulating rays L, onto the light receiving regions 23*a* and 23*b* of the pair of the one-dimensional CCD image sensors constituting the line sensor 20. The radiation image read-out apparatus still further comprises the stimulating ray cut-off filter 17 for transmitting only the emitted light M and filtering out the stimulating rays L, which are mixed slightly in the emitted light M impinging upon the SELFOC lens array 16. The radiation image read-out apparatus also comprises the line sensor 20 for receiving the emitted light M having passed through the stimulating ray cut-off filter 17 and for photoelectrically converting the emitted light M. The radiation image read-out apparatus further comprises the image information reading means 30. The image information reading means 30 is provided with the addition means 31 for performing addition processing on the outputs of the pixel regions of the one-dimensional CCD image sensors constituting the line sensor 20, which outputs correspond to an identical site on the sheet 50. The image information reading means 30 feeds out an image signal having been obtained from the addition processing.

The SELFOC lens array 16 acts such that an image of the emission area of the emitted light M on the sheet 50 is formed in one-to-one size relationship on the image surface at the light receiving regions 23*a* and 23*b* of the one-dimensional CCD image sensors. The optical system 12, which is constituted of the collimator lens and the toric lens, expands the stimulating rays L, which come from the BLD 11, into a desired irradiation area on the sheet 50.

How the embodiment of the radiation image read-out apparatus in accordance with the present invention, which is shown in FIG. 7, operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the addition means 31.

The BLD 11 radiates out the stimulating rays L having a linear pattern with a line width of approximately 100 μm. The stimulating rays L are radiated out at an angle of approximately 45 degrees with respect to the surface of the sheet 50. The stimulating rays L are collimated by the optical system 12, which is constituted of the collimator lens and the toric lens and is located in the optical path of the stimulating rays L. The collimated stimulating rays L impinge upon the surface of the sheet 50 at an angle of approximately 45 degrees with respect to the surface of the sheet 50. At this time, the stimulating rays L impinge upon the linear area (having a line width $d_L$ of approximately 100 μm) on the surface of the sheet 50, which linear area extends in the direction indicated by the arrow X.

When the sheet 50 is exposed to and stimulated by the linear stimulating rays L, the light M having an intensity in accordance with the image information stored on the sheet 50 is emitted from the area containing the exposed area and the neighboring areas. The emitted light M passes through the stimulating ray cut-off filter 17, which filters out the stimulating rays L mixed in the emitted light M. The emitted light M then impinges upon the SELFOC lens array 16 and is converged onto the light receiving regions 23*a* and 23*b* of the one-dimensional CCD image sensors constituting the line sensor 20.

The operation performed after the emitted light M is received by the line sensor 20 is the same as that in the aforesaid embodiment of the radiation image read-out apparatus in accordance with the present invention.

As described above, with the embodiment of the radiation image read-out apparatus in accordance with the present invention, which is shown in FIG. 7, the pair of the one-dimensional CCD image sensors, which have the light receiving width $d_P$ ($<d_M$) smaller than the line width $d_M$ of the emitted light M (i.e., the line width on the light receiving surface of the line sensor 20), are located with the fine gap 25 intervening between the light receiving regions 23*a* and 23*b*. The line sensor 20 is constituted in this manner. Therefore, no charge transfer region intervenes between the light receiving regions 23*a* and 23*b* of the one-dimensional CCD image sensors, and the substantial light receiving width is capable of being kept large. Also, of the light M emitted by the sheet 50 when the sheet 50 is exposed to the linear stimulating rays L irradiated from the stimulating ray source, the region of the emitted light M, at which the intensity of the emitted light is high, is capable of being received primarily. As a result, the emitted light is capable of being collected efficiently. Further, the problems are capable of being prevented from occurring in that much noise occurs due to the collection of weak emitted light. Furthermore, the cost of the radiation image read-out apparatus is capable of being kept low.

Figure 8:
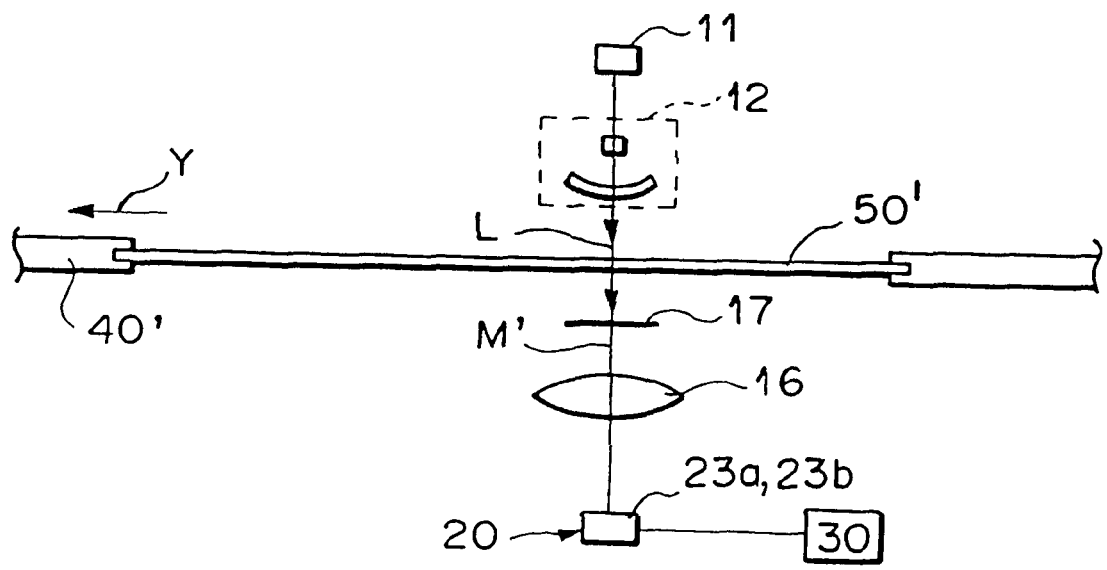
FIG. 8 is a schematic view showing a further different embodiment of the radiation image read-out apparatus in accordance with the present invention.

In the aforesaid embodiments of the radiation image read-out apparatus in accordance with the present invention, the BLD 11 for producing the stimulating rays L and the line sensor 20 are located on the same surface side of the sheet 50, and the emitted light M emanating from the surface of the sheet 50, upon which the stimulating rays L impinge, is received by the line sensor 20. Thus the constitutions are the reflection types of constitutions. However, the radiation image read-out apparatus in accordance with the present invention is not limited to the reflection types of constitutions. For example, as illustrated in FIG. 8, a stimulable phosphor sheet 50' whose substrate is formed from a material permeable to the emitted light M may be employed, and the BLD 11 for producing the stimulating rays L and the line sensor 20 may be located on opposite surface sides of the sheet 50'. In this manner, the emitted light M emanating from the surface opposite to the surface of the sheet 50', upon which the stimulating rays L impinge, may be received by the line sensor 20. Thus the constitution may be the transmission type of constitution.

Specifically, the radiation image read-out apparatus illustrated in FIG. 8 comprises a conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear stimulating rays L along the direction approximately normal to one surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the one surface of the sheet 50'. The radiation image read-out apparatus still further comprises the SELFOC lens array 16 having an optical axis, which is approximately normal to the one surface of the sheet 50'. The SELFOC lens array 16 converges light M', which is emitted from the other surface of the sheet 50' when the sheet 50' is exposed to the stimulating rays L (i.e., the other surface opposite to the one surface on the stimulating ray incidence side), onto the light receiving regions 23a and 23b of the pair of the one-dimensional CCD image sensors constituting the line sensor 20. The radiation image read-out apparatus also comprises the stimulating ray cut-off filter 17 for transmitting only the emitted light M' and filtering out the stimulating rays L, which are mixed slightly in the emitted light M' impinging image has been stored and which is supported by the conveyor belt 40', is conveyed in the direction indicated by the arrow Y. The conveyance speed of the sheet 50' is equal to the movement speed of the conveyor belt 40'. Information representing the movement speed of the conveyor belt 40' is fed into the addition means 31.

The BLD 11 radiates out the stimulating rays L having a linear pattern with a line width of approximately 100 μm. The stimulating rays L are radiated out in the direction approximately normal to the one surface of the sheet 50'. The stimulating rays L are collimated by the optical system 12, which is constituted of the collimator lens and the toric lens and is located in the optical path of the stimulating rays L. The collimated stimulating rays L impinge upon the one surface of the sheet 50' from the direction approximately normal to the one surface of the sheet 50'. At this time, the stimulating rays L impinge upon the linear area (having a line width $d_L$ of approximately 100 μm) on the one surface of the sheet 50', which linear area extends in the direction indicated by the arrow X.

When the sheet 50' is exposed to and stimulated by the linear stimulating rays L, the light M having an intensity in accordance with the image information stored on the sheet 50' is emitted from the area containing the exposed area and the neighboring areas. At the same time, the emitted light M' having passed through the transparent substrate of the sheet 50' emanates from a linear area of the other surface of the sheet 50'. upon the SELFOC lens array 16. The radiation image read-out apparatus further comprises the line sensor 20 for receiving the emitted light M' having passed through the stimulating ray cut-off filter 17 and for photoelectrically converting the emitted light M'. The radiation image read-out apparatus still further comprises the image information reading means 30. The image information reading means 30 is provided with the addition means 31 for performing addition processing on the outputs of the pixel regions 24a and 24b of the pair of the one-dimensional CCD image sensors constituting the line sensor 20, which outputs correspond to an identical site on the sheet 50. The image information reading means 30 feeds out an image signal having been obtained from the addition processing.

The SELFOC lens array 16 acts such that an image of the emission area of the emitted light M' on the other surface of the sheet 50' is formed in one-to-one size relationship on the image surface at the light receiving surfaces of the one-dimensional CCD image sensors. The optical system 12, which is constituted of the collimator lens and the toric lens, expands the stimulating rays L, which come from the BLD 11, into a desired irradiation area on the sheet 50'.

How the embodiment of the radiation image read-out apparatus in accordance with the present invention, which is shown in FIG. 8, operates will be described hereinbelow.

Firstly, the conveyor belt 40' moves in the direction indicated by the arrow Y, and the sheet 50', on which the radiation The emitted light M', which emanates from the linear area (having a line width $d_M'$) of the other surface of the sheet 50', passes through the stimulating ray cut-off filter 17, which filters out the stimulating rays L mixed in the emitted light M'. The emitted light M' then impinges upon the SELFOC lens array 16 and is converged onto the light receiving regions 23a and 23b of the one-dimensional CCD image sensors constituting the line sensor 20.

The operation performed after the emitted light M' is received by the line sensor 20 is the same as that in the aforesaid embodiment of the radiation image read-out apparatus in accordance with the present invention.

As described above, with the embodiment of the radiation image read-out apparatus in accordance with the present invention, which is shown in FIG. 8, the pair of the one-dimensional CCD image sensors, which have the light receiving width $d_P$ ($<d_M$) smaller than the line width $d_M$ of the emitted light M (i.e., the line width on the light receiving surface of the line sensor 20), are located with the fine gap 25 intervening between the light receiving regions 23a and 23b. The line sensor 20 is constituted in this manner. Therefore, no charge transfer region intervenes between the light receiving regions 23a and 23b of the one-dimensional CCD image sensors, and the substantial light receiving width is capable of being kept large. Also, of the light M emitted by the sheet 50' when the sheet 50' is exposed to the linear stimulating rays L irradiated from the stimulating ray source, the region of the emitted light M, at which the intensity of the emitted light is high, is capable of being received primarily. As a result, the emitted light is capable of being collected efficiently. Further, the problems are capable of being prevented from occurring in that much noise occurs due to the collection of weak emitted light. Furthermore, the cost of the radiation image read-out apparatus is capable of being kept low.

In lieu of the addition means 31, one of other kinds of operation means may be provided. Also, simple addition processing, weighted addition processing, or one of various other kinds of operation processing may be employed.

In the radiation image read-out apparatus in accordance with the present invention, the stimulable phosphor sheet for storing the radiation image may be an ordinary stimulable phosphor sheet comprising a stimulable phosphor for absorbing radiation and storing energy from the radiation, i.e. the radiation image.

Also, the radiation image read-out apparatus in accordance with the present invention may be employed in the radiation image recording and reproducing system proposed in, for example, Japanese patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., a phosphor for radiation absorption) is caused to absorb the radiation and to emit light having wavelengths falling within a ultraviolet to visible region. Also, the phosphor having good light emission response characteristics (i.e., a phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained. With the proposed radiation image recording and reproducing system, the detection quantum efficiency in the formation of the radiation image, i.e., the radiation absorptivity, the light emission efficiency, the emitted light pickup efficiency, and the like, is capable of being enhanced as a whole. Therefore, in the radiation image read-out apparatus in accordance with the present invention, the stimulable phosphor sheet should preferably contain the phosphor for energy storage described above. In such cases, the image quality of the obtained image is capable of being enhanced even further.

Further, the stimulable phosphor sheet employed in the radiation image read-out apparatus in accordance with the present invention maybe a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface. Also, two line sensors may be utilized, each of which is located on one of the opposite surface sides of the stimulable phosphor sheet, the two line sensors detecting two image signals, each of which is made up of a series of image signal components representing pixels in the radiation image, from the opposite surfaces of the stimulable phosphor sheet. Further, the apparatus may be provided with reading means for performing a subtraction process on image signal components of the two image signals, which image signal components represent corresponding pixels on the opposite surfaces of the stimulable phosphor sheet. In such cases, as each of the two line sensors located on opposite surface sides of the stimulable phosphor sheet, a line sensor may be utilized, which comprises a pair of one-dimensional CCD image sensors and in which the light receiving regions of the one-dimensional CCD image sensors are located close to each other with a fine gap intervening between the light receiving regions in the manner described above.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

What is claimed is:

1. A radiation image read-out method, comprising the steps of:
   i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation,
   ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor, the received light being subjected to photoelectric conversion performed by the line sensor,
   iii) moving the stimulable phosphor sheet with respect to the line light source and the line sensor and in a direction different from a length direction of the linear area of the stimulable phosphor sheet, and
   iv) successively reading outputs of the line sensor in accordance with the movement,
   wherein the line sensor comprises a pair of one-dimensional charge coupled device image sensors,
   wherein the one-dimensional charge coupled device image sensors comprise a light receiving region and a charge transfer region, and
   the light receiving regions of the one-dimensional charge coupled device image sensors are located close to each other so as to stand side by side with respect to a direction, which is normal to the length direction of the linear area of the stimulable phosphor sheet, and with a fine gap intervening between the light receiving regions.

2. A method as defined in claim 1 wherein addition processing is performed on the outputs of pixels of the light receiving regions of the one-dimensional charge coupled device image sensors, which pixels are located close to each other so as to stand side by side with respect to the direction normal to the length direction of the linear area of the stimulable phosphor sheet.

3. A method as defined in claim 1 or 2 wherein the stimulable phosphor sheet contains a stimulable phosphor, which is capable of absorbing light having wavelengths falling within a ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

4. A method as defined in claim 1 or 2 wherein positions of pixels of one of the one-dimensional charge coupled device image sensors and positions of pixels of the other one-dimensional charge coupled device image sensor are shifted from each other in the length direction of the linear area of the stimulable phosphor sheet.

5. A method as defined in claim 1 or 2 wherein a width of the fine gap between the light receiving regions of the one-dimensional charge coupled device image sensors, which width is taken in the direction normal to the length direction of the linear area of the stimulable phosphor sheet, is smaller than the width of each of the two light receiving regions, which width is taken in the direction normal to the length direction of the linear area of the stimulable phosphor sheet.

6. A method as defined in claim 1 or 2 wherein a sum of widths of the two light receiving regions and a width of the fine gap, which widths are taken in the direction normal to the length direction of the linear area of the stimulable phosphor sheet, is larger than a beam diameter of the stimulating rays, which beam diameter is taken in the direction normal to the length direction of the linear area of the stimulable phosphor sheet.

7. A method as defined in claim 1 or 2 wherein a light guiding optical system for guiding the light, which is emitted by the stimulable phosphor sheet, to a light receiving surface of the line sensor is located between the stimulable phosphor sheet and the line sensor, and the light guiding optical system is either one of an equi-magnification optical system and a magnifying optical system.

8. A method as defined in claim 1 or 2 wherein a filter for transmitting only the light emitted by the stimulable phosphor sheet and filtering out the stimulating rays is located between the stimulable phosphor sheet and the line sensor.

9. A radiation image read-out apparatus, comprising:

a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, iii) scanning means for moving the stimulable phosphor sheet with respect to the line light source and the line sensor and in a direction different from a length direction of the linear area of the stimulable phosphor sheet, and iv) reading means for successively reading outputs of the line sensor in accordance with the movement, wherein the line sensor comprises a pair of one-dimensional charge coupled device image sensors, wherein the one-dimensional charge coupled device image sensors comprise a light receiving region and a charge transfer region, and the light receiving regions of the one-dimensional charge coupled device image sensors are located close to each other so as to stand side by side with respect to a direction, which is normal to the length direction of the linear area of the stimulable phosphor sheet, and with a fine gap intervening between the light receiving regions.

10. An apparatus as defined in claim 9 further comprising operation processing means for performing addition processing on the outputs of pixels of the light receiving regions of the one-dimensional charge coupled device image sensors, which pixels are located close to each other so as to stand side by side with respect to the direction normal to the length direction of the linear area of the stimulable phosphor sheet.

11. An apparatus as defined in claim 9 or 10 wherein the stimulable phosphor sheet contains a stimulable phosphor, which is capable of absorbing light having wavelengths falling within a ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

12. An apparatus as defined in claim 9 or 10 wherein positions of pixels of one of the one-dimensional charge coupled device image sensors and positions of pixels of the other one-dimensional charge coupled device image sensor are shifted from each other in the length direction of the linear area of the stimulable phosphor sheet.

13. An apparatus as defined in claim 9 or 10 wherein a width of the fine gap between the light receiving regions of the one-dimensional charge coupled device image sensors, which width is taken in the direction normal to the length direction of the linear area of the stimulable phosphor sheet, is smaller than the width of each of the two light receiving regions, which width is taken in the direction normal to the length direction of the linear area of the stimulable phosphor sheet.

14. An apparatus as defined in claim 9 or 10 wherein a sum of widths of the two light receiving regions and a width of the fine gap, which widths are taken in the direction normal to the length direction of the linear area of the stimulable phosphor sheet, is larger than a beam diameter of the stimulating rays, which beam diameter is taken in the direction normal to the length direction of the linear area of the stimulable phosphor sheet.

15. An apparatus as defined in claim 9 or 10 wherein a light guiding optical system for guiding the light, which is emitted by the stimulable phosphor sheet, to a light receiving surface of the line sensor is located between the stimulable phosphor sheet and the line sensor, and the light guiding optical system is either one of an equi-magnification optical system and a magnifying optical system.

16. An apparatus as defined in claim 9 or 10 wherein a filter for transmitting only the light emitted by the stimulable phosphor sheet and filtering out the stimulating rays is located between the stimulable phosphor sheet and the line sensor.

17. A radiation image read-out apparatus according to claim 9, wherein the fine gap is disposed between the pair of line sensors in a direction normal to a length of the linear area of the stimulable phosphor sheet.

18. A radiation image read-out method according to claim 17, further comprising a first charge transport region disposed along one of the pair of line sensors in the normal direction relative to the linear area the stimulable phosphor sheet, on a side opposite the fine gap.

19. A radiation image read-out apparatus according to claim 18, further comprising a second transport region adjacent to the other of the pair of line sensors on a side opposite the fine gap.

* * * * *